WHITESIDE & CRABILL.
Cultivator.
No. 26,216. Patented Nov. 22, 1859.
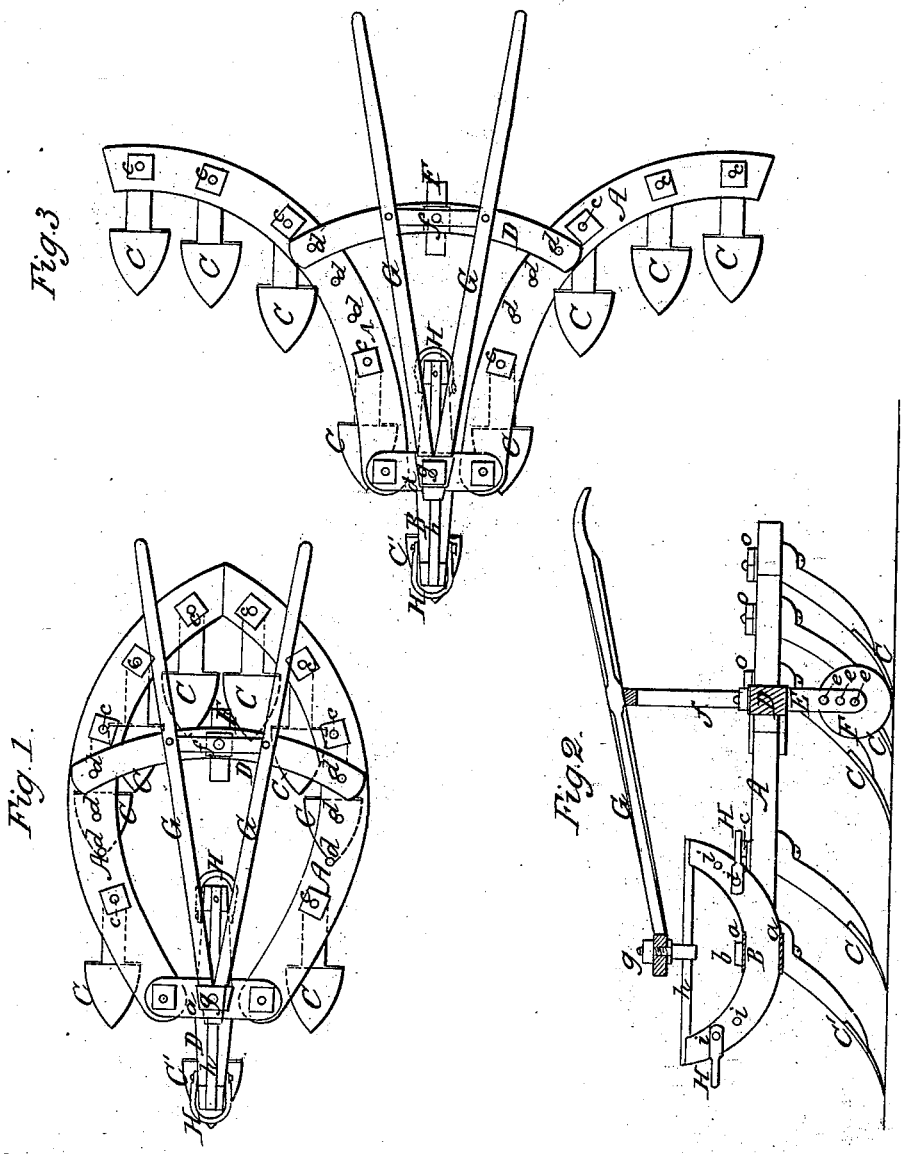

UNITED STATES PATENT OFFICE.

J. WHITESIDE AND H. F. CRABILL, OF FULLER'S CORNERS, INDIANA.

IMPROVEMENT IN CULTIVATORS.

Specification forming part of Letters Patent No. 26,216, dated November 22, 1859.

*To all whom it may concern:*

Be it known that we, J. WHITESIDE and H. F. CRABILL, both of Fuller's Corners, in the county of Whitley and State of Indiana, have invented a new and Improved Cultivator; and we do hereby declare that the following is a full, clear, and exact description of the same, reference being had to the accompanying drawings, forming a part of this specification, in which—

Figure 1 represents a plan or top view of our invention in its most contracted state. Fig. 2 is a longitudinal vertical section of the same. Fig. 3 is a plan or top view of the same when expanded.

Similar letters of reference in the three views indicate corresponding parts.

This invention consists, first, in arranging two curved shovel-beams in such a manner that they can be used with their concave sides facing each other and also reversed, bringing their convex sides toward each other, whereby our cultivator is adapted to different kinds of work; secondly, in combining with said hinged and curved shovel-beams a cross-bar with a gaging-wheel in such a manner that by shifting said bar the width of the shovel-beams is adjusted and that the depth to which the shovels cut is governed by said gaging-wheel; thirdly, in arranging a curved draft-beam in such a manner that the same allows of adjusting the clevis on either side higher or lower, as it may be desirable, and in such relation to the cross-bar and to the handles that a bar connecting the ends of said draft-beam serves as a guide for the handles when the cross-bar is adjusted.

To enable those skilled in the art to make and use our invention, we will proceed to describe its construction and operation.

The two shovel-beams A A are hinged to the plates *a a*, that are secured to the draft-beam B by means of a screw-bolt, *b*. Each of the shovel-beams is furnished with a series of shovels, C, that are secured to said beams by means of screw-bolts *c* in such a manner that they can be adjusted according to the position of the beams. An extra shovel, C', is fastened to the draft-beam B, and this shovel is so arranged that it can be reversed. The shovel-beams are curved, as clearly shown in Figs. 1 and 3, and when in their most contracted position their concave sides face each other and their rear ends are close together, as represented in Fig. 1. In this position our cultivator is used with from three to seven shovels to go between the rows and it is drawn by one horse. By reversing the shovel-beams and by bringing them to a position as shown in Fig. 3, our cultivator may be spread out to the width of from three to seven feet, and if so arranged it can be used to cultivate two rows of corn or other crop at the same time, or to make three rows of corn, as will be presently explained. The shovel-beams are adjusted by means of a cross-bar, D, which slides on the shovel-beams, so that it can be brought to match with different holes, *d*. Suspended from this cross-bar is a pendant, E, that forms the bearings for the gaging-wheel F. Said pendant is furnished with several holes, *e*, so that the wheel F can be placed higher or lower. This wheel serves to gage the depth to which the shovels are to cut. If the cultivator is to be used to cultivate two rows of corn at the same time, it is reversed, as above described, and the middle shovel, C', and the gaging-wheel F are removed and the cultivator is made to straddle one row; and if used for making three rows, all the shovels are removed, with the exception of the central shovel, C', and the two shovels nearest to the outer ends of the beams A.

The handles G are supported by a standard, *f*, that is rigidly attached to the cross-bar D, and their front ends are secured to an eyebolt, *g*, which slides on a rod, *h*, that unites the two ends of the draft-beam B. It will be noticed, by referring to Fig. 2 in the drawings, that this beam is curved, so that the eyebolt *g* can slide freely from end to end of the rod *h*, and that when the position of the cross-bar D is changed the front end of the handles is free to follow the motion of the cross-bar. The eyebolt *g* is split open from the top down to the eye, and its screwed part is somewhat tapering, so that when the nut is screwed down the loop or eye is drawn up tight to the rod *h*. Each side of the draft-beam is furnished with several holes, *i*, which serve to adjust the clevis H, whereby the direction of the draft can be changed as may be desired.

The shovels are flat from the point crosswise, but they are bent upward, though nearly straight, about one-third of the length. The sides of the shovels or their edges are slightly rounding from the top down to the point where they begin to bend, and altogether the form of our shovels is such as to cause them to scour in any kind of ground or soil.

Having thus fully described our invention, what we claim as new, and desire to secure by Letters Patent, is—

1. The arrangement and combination of the hinged curved shovel-beams A A, cross-bar D, and gaging-wheel F, substantially as and for the purpose set forth.

2. The curved draft-beam B, arranged as described, in combination with the cross-bar D, handles G, and rod $h$, substantially in the manner and for the purpose specified.

J. WHITESIDE.
H. F. CRABILL.

Witnesses:
O. W. GANDY,
D. McNEAR.